J. W. GREEN.
COMBINED FRICTION DRIVE AND BRAKE MECHANISM.
APPLICATION FILED JULY 2, 1910.
989,777.
Patented Apr. 18, 1911.
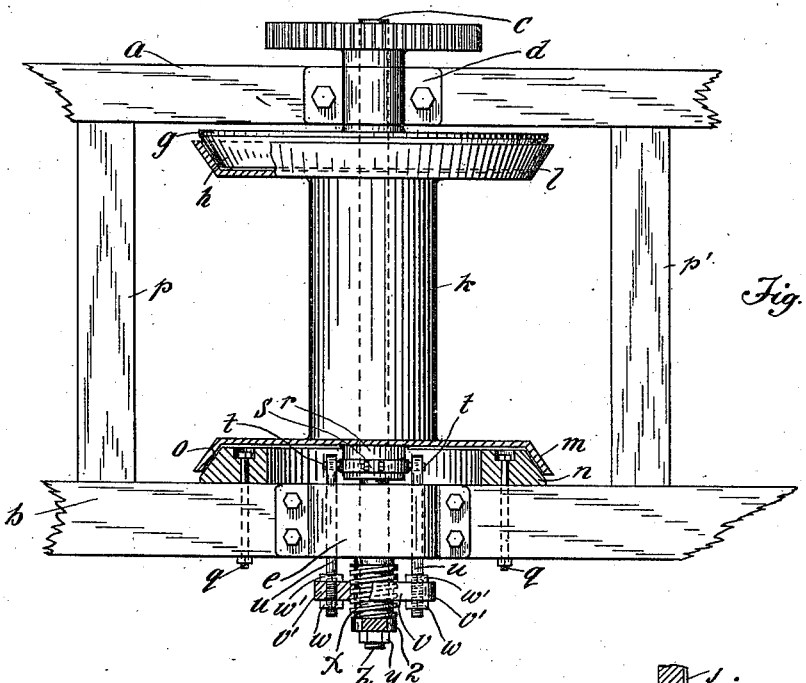
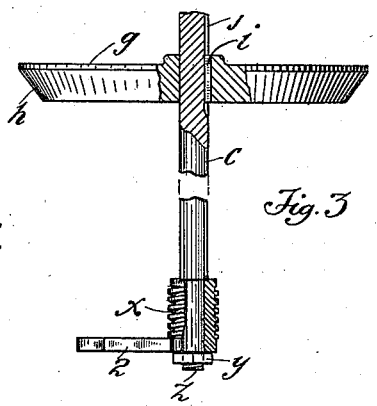
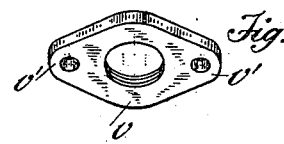
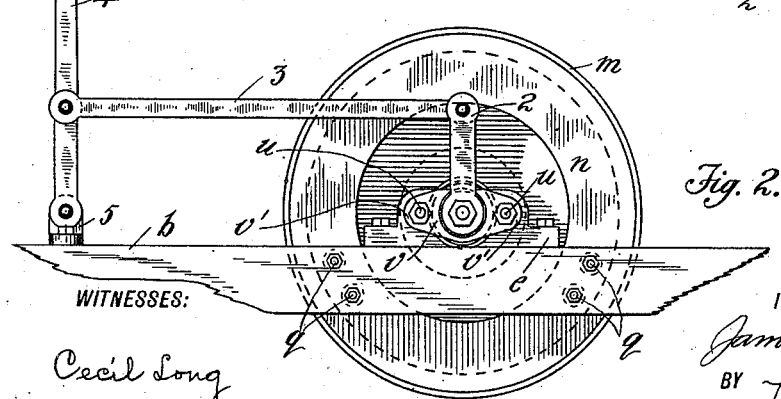

UNITED STATES PATENT OFFICE.

JAMES W. GREEN, OF PORTLAND, OREGON.

COMBINED FRICTION DRIVE AND BRAKE MECHANISM.

989,777.  Specification of Letters Patent.  Patented Apr. 18, 1911.

Application filed July 2, 1910. Serial No. 570,179.

*To all whom it may concern:*

Be it known that I, JAMES W. GREEN, a citizen of the United States, and a resident of Portland, in the county of Multnomah and State of Oregon, have invented a new and useful Improvement in Combined Friction Drive and Brake Mechanism, of which the following is a specification.

This invention has for its object to obtain a combined friction drive and brake mechanism, serviceable for hoisting and power transmitting, and other operating devices; further to so construct my mechanism that the same comprises only few parts, and is of durable construction, and to so arrange the mechanism, as a whole, that a short movement of a lever will simultaneously release the brake and throw on the friction transmission, and vice versa.

To this end my invention comprises the specific features hereinafter set forth.

In the drawings: Figure 1 is a sectional plan view, showing ground sills or timbers, on which is rotatably mounted a drum and driving devices embodying my invention; Fig. 2 is an elevation of the near side of the device shown in Fig. 1, this view showing the operating lever and connections, which are omitted in the preceding view; Fig. 3 is a sectional detail of the shaft of my device, also showing the friction disk keyed to one end of the shaft, the thread sleeve provided at the opposite end of the shaft, and the crank arm provided on such sleeve for rotating the same; Fig. 4 is a detail of a strap ring constituting one of the parts of my invention; and Fig. 5 is a perspective detail of a nut-like member used in my device.

On the ground sills, $a$, $b$, connected by cross ties $p$, $p'$ are mounted bearing blocks and boxes, $d$, $e$, in which the ends of the driving shaft $c$ are journaled. At one end of the driving-shaft $c$ is rigidly mounted a transmission friction disk $g$, and at the opposite end of the shaft is mounted a disk $n$, constituting a stationary brake member, being bolted to the frame member, $b$, by bolts $q$, $q$. The friction disk $g$ is rigidly secured in place on the shaft by means of a key $i$, inserted in the key-way $j$, shown in Fig. 3. The disks $g$, $n$ are made with bevel faces $h$, $o$. On the shaft $c$ is loosely mounted a drum $k$, provided at its ends with integral flanges $l$, $m$, cup-shaped at the rims so as to be adapted to have operative contact either with the friction disk $g$, or the brake member $n$. The drum $k$ is further provided with an integral hub $r$, which is provided with a peripheral groove, in which is loosely mounted a rim-strap $s$, provided with laterally extending trunnions, $t$, $t$, on which are affixed the inner ends of eye-bolts $u$, $u$, which are provided with threaded extremities extending through the lateral arms $v'$ of a nut-like plate or yoke member $v$, which is secured in place on the eye-bolts, $u$, $u$, by nuts $w$, $w'$. Said nut-like member or yoke $v$ is mounted on a sleeve $x$, which is mounted on the projecting end of the shaft $c$, and is provided with an exterior peripheral thread. The sleeve $x$ is provided with an integral crank arm 2, which is connected by a rod 3 with a lever 4, the lower end of which lever is pivoted to a lug 5, on the ground-sill $b$.

As will be observed from Fig. 1, the threaded sleeve $x$ is held against lengthwise movement on the shaft between the shoulder provided on the latter and a nut $y$ on the threaded extremity $z$ of the shaft $c$.

By moving the lever 4 the sleeve $x$ is partially rotated, which shifts the position of the drum, bringing it into operative contact either with the brake member $n$ or the disk $g$.

While the brake member $n$ is conveniently made in the form of a disk, I do not confine myself to such construction.

I claim:

1. In a friction drive, the combination of a shaft and bearings therefor; a friction disk fast on one end of the shaft; a stationary brake member at the opposite end of the shaft; a drum loose on the shaft between said friction disk and the brake member, said drum provided with flanges at its ends; the parts adapted to cause the flanges of the drum to be operatively engaged by either the friction disk or the brake member when placed in contact therewith; a sleeve on one end of the shaft exterior of the drum; means holding said sleeve against endwise movement; a yoke threaded on said sleeve; connections between said yoke and the drum; and means for rotating the sleeve in order to shift the drum.

2. In a friction drive, the combination of a shaft and bearings therefor; a friction disk fast on one end of the shaft; a stationary brake member at the opposite end of the shaft; a drum loose on the shaft between said friction disk and the brake member, said drum provided with flanges at its ends;

the parts adapted to cause the flanges of the drum to be operatively engaged by either the friction disk or the brake member when placed in contact therewith; a sleeve on one end of the shaft exterior of the drum; means holding said sleeve against endwise movement; a yoke threaded on said sleeve; said drum provided with a hub; a strap ring rotatably secured on said hub; connections between said strap ring and said yoke; and means for rotating the sleeve in order to shift the drum.

3. In a friction drive, the combination of a shaft and bearings therefor; a friction disk fast on one end of the shaft; a stationary brake member at the opposite end of the shaft; a drum loose on the shaft between said friction disk and the brake member, said drum provided with flanges at its ends; the parts adapted to cause the flanges of the drum to be operatively engaged by either the friction disk or the brake member when placed in contact therewith; a sleeve on one end of the shaft exterior of the drum; means holding said sleeve against endwise movement; a yoke threaded on said sleeve; a strap ring rotatably secured on said hub; said strap ring provided with lateral projections; said yoke also provided with lateral arms, bolts connecting the lateral portions of the strap ring and said yoke; and means for rotating the sleeve in order to shift the drum.

4. In a friction drive, the combination of a shaft and bearings therefor; a friction disk fast on one end of the shaft; a stationary brake member at the opposite end of the shaft; a drum loose on the shaft between said friction disk and the brake member, said drum provided with flanges at its ends; the parts adapted to cause the flanges of the drum to be operatively engaged by either the friction disk or the brake member when placed in contact therewith; a sleeve on one end of the shaft exterior of the drum; said sleeve provided with a rigid crank arm; means holding said sleeve against endwise movement; a yoke threaded on said sleeve; said drum provided with a hub; a strap ring rotatably secured on said hub; connections between said strap ring and said yoke; and means connected to said crank arm of the sleeve for rotating the latter, in order to shift the drum.

5. In a friction drive, the combination of a shaft and bearings therefor; a friction disk fast on one end of the shaft; a stationary brake member at the opposite end of the shaft; a drum loose on the shaft between said friction disk and the brake member, said drum provided with flanges at its ends; the parts adapted to cause the flanges of the drum to be operatively engaged by either the friction disk or the brake member when placed in contact therewith; a sleeve on one end of the shaft exterior of the drum; said sleeve provided with a rigid crank arm; means holding said sleeve against endwise movement; a yoke threaded on said sleeve; said drum provided with a hub; a strap ring rotatably secured on said hub; said strap ring provided with lateral projections; said yoke also provided with lateral arms, bolts connecting the lateral portions of said strap ring and said yoke; and means connected to said crank arm of the sleeve for rotating the latter, in order to shift the drum.

JAMES W. GREEN.

Witnesses:
 GEO. A. BRODIE,
 C. B. LONG.

Copies of this patent may be obtained for five cents each, by addressing the "Commissioner of Patents, Washington, D. C."